US009428008B2

(12) United States Patent
Carpinella et al.

(10) Patent No.: US 9,428,008 B2
(45) Date of Patent: Aug. 30, 2016

(54) SOCKET ASSEMBLY

(71) Applicant: Carpin Manufacturing, Inc., Waterbury, CT (US)

(72) Inventors: Ralph Carpinella, Woodbury, CT (US); Robert Dombroski, Waterbury, CT (US); David Ferraro, Cheshire, CT (US)

(73) Assignee: CARPIN MANUFACTURING, INC., Waterbury, CT (US)

( * ) Notice: Subject to any disclaimer, the term of this patent is extended or adjusted under 35 U.S.C. 154(b) by 398 days.

(21) Appl. No.: 14/085,919

(22) Filed: Nov. 21, 2013

(65) Prior Publication Data

US 2015/0139724 A1  May 21, 2015

(51) Int. Cl.
*G05G 1/12* (2006.01)
*B60B 33/00* (2006.01)

(52) U.S. Cl.
CPC ........ *B60B 33/0002* (2013.01); *B60B 33/0036* (2013.01); *B60B 33/0049* (2013.01); *B60B 33/0057* (2013.01); *B60B 33/0068* (2013.01); *B60B 33/0073* (2013.01); *Y10T 16/211* (2015.01); *Y10T 16/216* (2015.01); *Y10T 403/70* (2015.01); *Y10T 403/7039* (2015.01)

(58) Field of Classification Search
CPC .......... B60B 33/0002; B60B 33/0036; B60B 33/0068; B60B 33/0057; B60B 33/0049; B60B 33/0073; Y10T 403/7039; Y10T 403/70; Y10T 16/211; Y10T 16/216
USPC .................................................. 403/361, 131
See application file for complete search history.

(56) References Cited

U.S. PATENT DOCUMENTS

| 1,429,187 | A | * | 9/1922 | Bunker | ............... | B60B 33/0002 |
| | | | | | | 16/19 |
| 1,848,347 | A | * | 3/1932 | Jarvis | .................. | B60B 33/0002 |
| | | | | | | 16/39 |
| 2,173,950 | A | | 9/1939 | Parkhill | | |
| 2,294,807 | A | | 9/1942 | Schultz, Jr. | | |
| 2,520,375 | A | * | 8/1950 | Roe | ..................... | B60B 33/0002 |
| | | | | | | 16/39 |
| 3,096,539 | A | * | 7/1963 | Dickinson | ............. | E05D 15/266 |
| | | | | | | 16/242 |
| 3,128,495 | A | | 4/1964 | Tooth | | |
| 3,455,526 | A | * | 7/1969 | Orii | ....................... | F16F 1/3615 |
| | | | | | | 16/26 |
| 4,731,900 | A | * | 3/1988 | Frobose | .............. | B60B 33/0002 |
| | | | | | | 16/38 |
| 4,788,741 | A | * | 12/1988 | Hilborn | ............... | B60B 33/0002 |
| | | | | | | 16/35 R |
| 4,805,260 | A | | 2/1989 | Tooth | | |
| 5,052,075 | A | | 10/1991 | Harris | | |
| 5,555,954 | A | * | 9/1996 | Swiderski | ................. | E04G 1/34 |
| | | | | | | 182/119 |
| 5,742,977 | A | * | 4/1998 | Hoofe, III | ........... | B60B 33/0002 |
| | | | | | | 16/30 |
| 5,765,960 | A | | 6/1998 | Carpinella | | |
| 5,894,614 | A | * | 4/1999 | Stroud | ................. | A47B 91/028 |
| | | | | | | 5/200.1 |

(Continued)

FOREIGN PATENT DOCUMENTS

JP  2003-074528  12/2003

*Primary Examiner* — Chi Q Nguyen
(74) *Attorney, Agent, or Firm* — Carmody Torrance Sandak & Hennessey LLP

(57) ABSTRACT

A socket for coupling an end piece to a leg member of an article of furniture is described. The socket is insertable into an opening in the leg member and the socket has an opening therein for receiving a stem of the end piece. The socket comprises a tubular body having upper and lower ends. The lower end comprises the opening for receiving the stem of the end piece and the upper end is insertable into the leg member. In addition, the socket comprises a washer attached to the upper end of the socket. When the socket is inserted into the leg member, the washer has an interference fit with the inner diameter of the leg member.

19 Claims, 2 Drawing Sheets

(56) References Cited

U.S. PATENT DOCUMENTS

| | | | |
|---|---|---|---|
| 5,991,974 A | 11/1999 | Carpinella | |
| 6,154,923 A | 12/2000 | Carpinella | |
| 6,354,231 B1 * | 3/2002 | Morris | A47B 91/028 108/144.11 |
| 6,478,270 B2 * | 11/2002 | Parisi | A47B 91/024 16/32 |
| 6,568,031 B1 * | 5/2003 | Polevoy | A47C 19/024 16/18 CG |
| 6,796,001 B1 * | 9/2004 | Finkelstein | B60B 33/0002 16/19 |
| 6,810,561 B1 * | 11/2004 | Liu | B60B 33/0002 16/31 A |
| 6,932,314 B2 * | 8/2005 | Patterson | B60B 33/0002 16/31 A |
| 7,552,508 B2 * | 6/2009 | Underwood | B60B 33/0002 16/30 |
| 7,594,874 B2 * | 9/2009 | Meissner | A63B 69/0048 482/36 |
| 8,240,004 B2 | 8/2012 | Carpinella et al. | |
| D666,479 S | 9/2012 | Carpinella et al. | |
| 8,313,066 B2 * | 11/2012 | Hampton | A61M 5/1415 16/30 |
| 2012/0096680 A1 | 4/2012 | Carpinella et al. | |

* cited by examiner

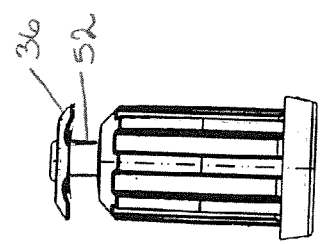
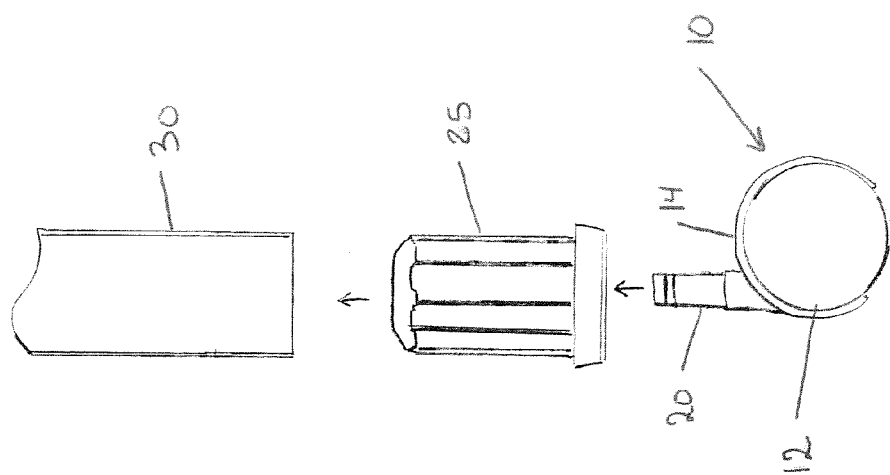

SECTION A-A though the assembly is shown as it relates to a caster, other end pieces, including glides and adjusters, can be attached to the tubular leg member 30 in a similar manner. Typical assemblies are described, for example, in U.S. Pat. No. 2,294,807 to Schulz, U.S. Pat. No. 2,173,950 to Parkhill, and U.S. Pat. No. 3,128,495 to Tooth.

SOCKET ASSEMBLY

FIELD OF THE INVENTION

The present invention relates generally to a socket for a tubular leg member enabling the coupling of various end pieces, including casters, glides and adjusters to the tubular leg member.

BACKGROUND OF THE INVENTION

Caster assemblies are generally well known in the art for carrying out easy movement of an article. These assemblies are provided on a wide variety of articles that are moveable by rolling, including chairs and other furniture (desks, tables, sofas, beds, etc.), stands for medical equipment and other instrumentation, cabinets, work surfaces, dollies, and the like. In addition, other end pieces including glides and adjusters for longitudinal adjustment are also attachable to a wide variety of articles.

Chairs, including industrial and office chairs, as well as other articles of furniture, are often produced with tubular metal legs as need and buyer demand dictates. The tubular legs are typically constructed of metal tubing stock which has an inside diameter that may be substantially larger than the stem of a caster or other end piece that is being coupled thereto and therefore an insert must be installed in the tubular metal leg which forms a socket for coupling the stem of the caster (or other end piece) to the leg member. Alternatively, the leg member may comprise a hard plastic resin material depending on the configuration of the article. As used herein the term "leg member" is intended to cover the legs of chairs, stools and other seats as well as diverse furniture articles (desks, tables, sofas, beds, etc.) having legs that may desirably require casters, glides or adjusters.

As shown in FIG. 1, a caster assembly may comprise caster 10 comprising a wheel 12 that is rotationally coupled to a caster frame 14. The caster frame 14 is coupled to a stem 20 which allows the caster assembly to be rotationally attached to a tubular leg member 30 such that the wheel 12 is free to pivot relative to the tubular leg member. Additionally, while the assembly is shown as it relates to a caster, other end pieces, including glides and adjusters, can be attached to the tubular leg member 30 in a similar manner. Typical assemblies are described, for example, in U.S. Pat. No. 2,294,807 to Schulz, U.S. Pat. No. 2,173,950 to Parkhill, and U.S. Pat. No. 3,128,495 to Tooth.

As shown in FIG. 1, the stem 20 is inserted into an opening in the socket 25 in which the stem 20 is to be retained. The socket 25 is pressfit or otherwise retained in a cavity within the leg member 30 (or other similar leg member) dimensioned to receive the socket.

The socket 25 for coupling the caster to the leg member is typically constructed of a hard plastic resin, such as Nylon-6. One of the problems with the use of these hard plastic resins is that the socket 25 is subjected to stresses to the socket from the caster caused by the movement of the caster during its normal use. These stresses can cause the socket to become worn and loosen within the leg member 30. If this occurs, the socket can eventually dislodge, along with the caster or other end piece, from the tubular leg member making it difficult or virtually impossible to retain the caster within the leg member.

Thus, there remains a need in the art for an improved device for securing casters and/or other end pieces to articles of furniture and the like.

SUMMARY OF THE INVENTION

It is an object of the present invention to provide an improved socket for coupling casters and other end pieces to articles of furniture and the like.

It is another object of the present invention to provide an improved socket for coupling casters and other end pieces to a leg member of an article of furniture that minimizes failure of the socket assembly.

To that end, in one embodiment the present invention relates generally to a socket for coupling an end piece to a leg member, wherein the socket is insertable into an opening in the leg member and the socket has an opening therein for receiving a stem of the end piece, the socket comprising:

a tubular body having upper and lower ends, wherein the lower end comprises the opening for receiving the stem of the end piece and the upper end is insertable into the leg member; and a washer attached to the upper end of the socket, the washer having at least a substantially planar inner portion;

wherein when the socket is inserted into the leg member, the washer has an interference fit with the inner diameter of the leg member.

In another embodiment, the present invention relates generally to an assembly for securing an end piece to a leg member, the assembly comprising:

a) a socket for coupling the end piece to the leg member, wherein the socket is insertable into an opening of the leg member and the socket being capable of receiving a stem of the end piece, the socket comprising:

a tubular body having upper and lower ends, wherein the lower end comprises the opening for receiving the stem of the end piece and the upper end is insertable into the leg member; and a washer attached to the upper end of the socket, the washer having at least a substantially planar inner portion;

b) an end piece couplable to the lower end of the socket, wherein the end piece comprises a stem that is insertable into the lower end of the socket; and c) a leg member couplable to an upper end of the socket, wherein the socket is insertable into the opening of the leg member;

wherein when the socket is inserted into the leg member, the washer has an interference fit with the inner diameter of the leg member.

BRIEF DESCRIPTION OF THE DRAWINGS

For a fuller understanding of the invention, reference is had to the following description taken in connection with the accompanying figures, in which:

FIG. 1 depicts a typical caster assembly.

FIG. 3 depicts a socket in accordance with another embodiment of the present invention.

Also, while not all elements may be labeled in each figure, all elements with the same reference number indicate similar or identical parts.

DETAILED DESCRIPTION OF THE PREFERRED EMBODIMENTS

The present invention relates generally to an improved socket for coupling a caster or other end piece to a leg member of an article of furniture or the like. The improved socket comprises a washer coupled to an end of the socket that is insertable into the tubular leg member of an article of furniture.

Figure 2B:
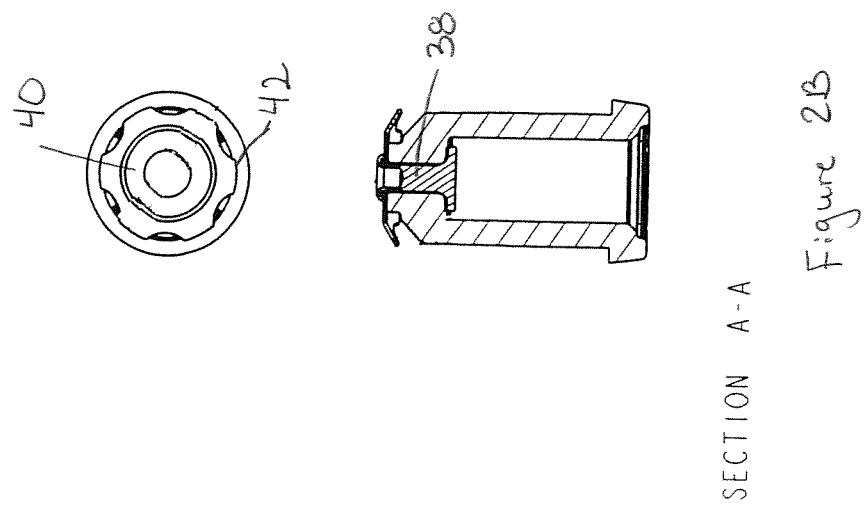
FIGS. 2A and 2B depicts a socket in accordance with one embodiment of the present invention.
Figure 2A:
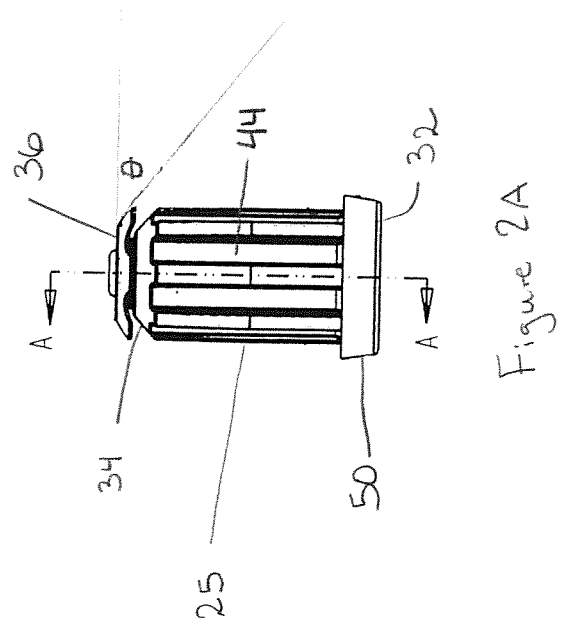

In one preferred embodiment, and as shown in FIGS. 2A and 2B, the present invention relates generally to a socket 25 for coupling an end piece to a leg member, wherein said socket is insertable into an opening in the leg member and the socket has an opening therein for receiving a stem of the end piece, the socket comprising:

a tubular body having upper and lower ends (32 and 34), wherein the lower end 32 comprises the opening for receiving the stem of the end piece and the upper end 34 is insertable into the leg member; and a washer 36 attached to the upper end 34 of the socket 25, the washer 36 having at least a substantially planar inner portion 40;

wherein when the socket is inserted into the leg member, the washer has an interference fit with the inner diameter of the leg member.

As set forth herein, the leg member may comprise a leg of a chair, stool, or other seat or a leg of a table, desk, sofa, bed, cabinet, dolly, etc. by way of example and not limitation. Thus, the leg member may be any of a wide variety of articles for which easy movement and/or longitudinal adjustment is desired.

The socket optionally, but preferably is injection molded from a suitable thermoplastic material. One preferred materials is a polyamide such as Nylon-6 or another similar polyamide. The polyamide may be reinforced with fiberglass to provide additional rigidity. Based thereon, the polyamide composition may comprise about 7 to about 50% by weight fiberglass, more preferably about 15 to about 35% by weight fiberglass. Too much fiberglass can cause the polyamide to be more brittle, while too little fiberglass may result in a product that does not have sufficient rigidity.

In one preferred embodiment, the socket 25 optionally, but preferably, comprises a plurality of longitudinal ribs 44 arranged circumferentially around an outer diameter of the tubular body. If used, these longitudinal ribs 44 may extend substantially along the entire length of the tubular body. While longitudinal ribs that do not extend along the entire length of the tubular body may also be used, it is preferred that the ribs extend along most if not all of the length of the tubular body to maintain good support of the socket 25 within the leg member. Additionally, the number of ribs is not important, however it is necessary that enough ribs are provided to provide substantially 360° support to the socket and thus in one embodiment, the tubular body comprises at least six longitudinal ribs arranged around the outer diameter thereof and may contain additional longitudinal ribs, depending on the size of the ribs and importantly, the size (and shape) of the socket.

An impact modifier may also be added to the polyamide composition to toughen the composition, thus adjusting the impact strength of the composition. One example of a suitable impact modifier is a low modulus polyolefin with reactive groups providing both anhydride and acid functionality which enable chemical bonds, including those available from DuPont under the tradename Fusabond®. Other impact modifiers would also be known to those skilled in the art.

The outer diameter of the tubular body, is slightly larger than the corresponding inner diameter of the leg opening and thus the tubular body compresses slightly as it is press-fit or otherwise inserted into the leg opening. Thus, the socket is press-fit into the lower end of the leg opening or, alternatively, a recess created within the leg opening that is dimensioned to receive the socket and is automatically maintained in position therein. A caster or other end piece (as shown in FIG. 1) may then be coupled to the socket 25 by securing the upstanding stem 20 of the caster within the socket 25.

The socket 25 is preferably press-fit into the opening of the leg member so as to retain the socket securely within the leg member. Preferably a hydraulic device or similar device is used to provide the force required to press-fit the socket 25 into the leg member.

As the socket 25 is press-fit or otherwise inserted into the opening of the leg member, the washer 36 flexes inward and downward toward the outer surface of the tubular body. Once the socket 25 has been completely inserted, the washer 36 then rebounds outward within the leg member to grip the inner diameter of the leg member. Because the washer 36 is metal, the socket of the present invention (with the washer 36 attached thereto) is much less likely to wear out and fail over time as compared with a socket that is made exclusively of a hard plastic resin.

As described herein the washer 36 is dimensioned so as to have an interference fit with the inner diameter of the leg member when the socket is inserted therein. That is, the washer 36 has a diameter that is slightly larger than the inner diameter of the leg member and preferably, the washer is also dimensioned to have a diameter is slightly larger than the outer diameter of the tubular body of the socket. In addition, the tubular body of the socket also optionally, but preferably, has an interference fit with the inner diameter of the leg member. Thus, the diameter of the washer may be, for example, between about 0.01 and 0.06 inches larger, more preferably between about 0.02 and 0.04 inches larger than the inner diameter of the leg member.

The use of the washer 36 attached to the upper end 34 of the socket 25 provides additional lateral stability to the socket to maintain the socket securely within the leg member. The washer 36 may be attached to the upper end 34 of the socket 25 by various means. In a preferred embodiment, the washer 36 is riveted, such as with rivet 38, to the upper end 34 of the socket 25. The rivet 38 typically comprises cold forged, low carbon steel and may be zinc plated.

As shown in FIG. 2B, the washer 36 comprises a flat inner portion 40 that engages the upper end 34 of the socket and an outer portion. In one embodiment, the outer portion optionally, but preferably, includes a plurality of cut outs 42 arranged circumferentially therearound. If used, these cutouts 42 can vary in size, shape and quantity depending in part on the material used for the washer, the size of the socket, and the desired interference fit with the tubular member.

The outer portion of the washer 36 along with the cut outs 42 (if used) is capable of flexing at least slightly as the washer 36 is inserted into the tubular leg member, and then rebounding against the inner diameter of the tubular member, once the washer 36 has been fully inserted therein. In addition, to aid in insertion of the socket 25 into the leg member and to provide additional lateral support of the socket 25 within the leg member, the outer portion of the washer is preferably angled down and away from the substantially planar inner portion 40 (and thus the top surface of the tubular body), whereby the outer portion of the washer flexes downward and inward towards the outer surface of the tubular body of the socket 25 as the socket 25 is inserted and then rebounds against the inner diameter of the leg member once the socket 25 has been fully inserted therein. The angle of the outer portion of the washer 36 is shown in FIG. 2 as the angle θ formed by the washer's substantially planar inner portion 40 and the outer portion of the washer 36. Thus, in one embodiment, the outer portion of the washer is angled about 30 to about 60 degrees as measured from the washer's substantially planar inner portion 40 (i.e. top surface), more preferably about 40 to about 50 degrees.

The washer 36 is preferably stamped from high carbon steel. Thereafter, the washer 36 is optionally, but preferably hardened and spring tempered. The steel is spring tempered to increase its upper limit of elasticity which allows the washer 36 to flex in the manner described herein. Spring tempering involves hardening and tempering as is normally performed and then reheating the steel until it exhibits a bright blue color. In addition the steel typically has a Rockwell C-scale (RC) value of between about 35-55 RC, more preferably about 40-50 RC.

The leg opening may exhibit a substantially circular, oval, or square cross-sectional shape among others and the washer preferably exhibits the same cross-sectional shape. What is most important is that the washer 36 has an interference fit with the inner diameter of the leg opening over a substantial portion of the inner diameter of the tubular leg member to provide the necessary lateral stability.

In addition, as seen in FIG. 2A, the socket may also comprise an enlarged diameter flange 50 at the lower end 32 of the socket 25, such that the socket is inserted into the leg member only until the enlarged diameter flange 50 contacts the end of the leg member. This ensures that the socket 25 is properly positioned within the leg member.

In another embodiment of the present invention and as shown in FIG. 3, the washer is attached (by a rivet or otherwise) to the socket 25 via a stand-off portion 52. The use of this stand-off portion 52 allows the washer 36 to flex more readily and also aids in the insertion of the socket 25 into the leg member.

In another preferred embodiment, the present invention also relates generally to an assembly for securing an end piece to a leg member, the assembly comprising:

a) a socket for coupling the end piece to the leg member, wherein the socket is insertable into an opening of the leg member and the socket being capable of receiving a stem of the end piece, the socket comprising:
a tubular body having upper and lower ends, wherein the lower end comprises the opening for receiving the stem of the end piece and the upper end is insertable into the leg member; and
a washer attached to the upper end of the socket, the washer having at least a substantially planar inner portion;
b) an end piece couplable to the lower end of the socket, wherein the end piece comprises a stem that is insertable into the lower end of the socket; and
c) a leg member couplable to an upper end of the socket, wherein the socket is insertable into the opening of the leg member;
wherein when the socket is inserted into the leg member, the washer has an interference fit with the inner diameter of the leg member.

As can be seen from the foregoing as well as the figures, the present invention provides for improvements over the prior art in that the present invention provides an improved socket for coupling a caster or other end piece to an article of furniture that overcomes the deficiencies of the prior art.

As indicated above, one of the weaknesses of prior art sockets is that upon use, the socket has a tendency to wear out and fail, which can cause the socket to dislodge, along with the caster or other end piece, from the leg member. Furthermore, it is difficult when fabricating sockets of a relatively small diameter to make a part that does not wear out. The improved socket described herein overcomes the deficiencies of the prior art because the washer provides an additional gripping surface against the inner diameter of the leg member. In addition, the washer is metal and is thus much less likely to wear out than a similar prior art socket that is composed solely of a hard plastic material.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall therebetween.

What is claimed is:

1. A socket for coupling an end piece to a leg member, wherein said socket is insertable into an opening in the leg member and the socket has an opening therein for receiving a stem of the end piece, the socket comprising:
a tubular body having upper and lower ends, wherein the lower end comprises the opening for receiving the stem of the end piece and the upper end is insertable into the leg member, wherein the tubular body comprises a thermoplastic material; and
a washer attached to the upper end of the socket, the washer having at least a substantially planar inner portion, wherein the washer comprises high carbon steel;
wherein when the socket is inserted into the leg member, the washer has an interference fit with the inner diameter of the leg member; and
wherein the washer is riveted to the upper end of the socket.

2. The socket according to claim 1, wherein the tubular body comprises a plurality of longitudinal ribs arranged around an outer circumference thereof.

3. The socket according to claim 2, wherein the washer has an outer diameter that is larger than the outer diameter of the plurality of longitudinal ribs.

4. The socket according to claim 1, wherein the washer comprises a plurality of cut outs arranged around an outer circumference thereof.

5. The socket according to claim 1, wherein the high carbon steel washer comprises spring tempered steel.

6. The socket according to claim 1, wherein the end piece is selected from the group consisting of casters, glides and adjusters.

7. The socket according to claim 1, wherein the washer is capable of flexing as the socket is inserted into the leg member.

8. The socket according to claim 1, wherein an outer portion of the washer is angled away from the substantially planar inner portion of the washer at an angle of about 30 to about 60 degrees as measured from the substantially planar inner portion.

9. The socket according to claim 1, comprises an enlarged diameter flange at the lower end of the socket.

10. The socket according to claim 1 comprising a stand-off portion at the upper end of the socket, the stand-off portion having a smaller diameter than the diameter of the tubular body, wherein the washer is attached to a top of the stand-off portion.

11. An assembly comprising:
a) a socket comprising:
a tubular body having upper and lower ends, wherein the lower end comprises an opening for receiving a stem, wherein the tubular body comprises a thermoplastic material; and
a washer attached to the upper end of the socket, the washer having at least a substantially planar inner portion, wherein the washer comprises high carbon steel;
b) an end piece couplable to the lower end of the socket, wherein the end piece comprises the stem that is insertable into the lower end of the socket; and
c) a leg member couplable to an upper end of the socket, wherein the socket is insertable into an opening of the leg member;
wherein when the socket is inserted into the leg member, the washer has an interference fit with the inner diameter of the leg member; and
wherein the washer is riveted to the upper end of the socket.

12. The assembly according to claim 11, wherein the socket is press fit into the opening of the leg member, and wherein as the socket is inserted into the opening of the leg member, the washer flexes.

13. The assembly according to claim 11, wherein the tubular body comprises a plurality of longitudinal ribs arranged around an outer circumference thereof.

14. The assembly according to claim 11, wherein the washer has an outer diameter that is larger than the inner diameter of the opening of the leg member.

15. The assembly according to claim 11, wherein the washer comprises a plurality of cut outs arranged around an outer circumference thereof.

16. The assembly according to claim 11, wherein the high carbon steel washer comprises spring tempered steel.

17. The assembly according to claim 11, wherein the end piece is selected from the group consisting of casters, glides and adjusters.

18. The assembly according to claim 11, wherein the washer is capable of flexing as the socket is inserted into the leg member.

19. The assembly according to claim 11, wherein an outer portion of the washer is angled away from the substantially planar inner portion of the washer at an angle of about 30 to about 60 degrees as measured from the substantially planar inner portion.

* * * * *